(12) United States Patent
Lee et al.

(10) Patent No.: US 9,899,638 B2
(45) Date of Patent: Feb. 20, 2018

(54) RECHARGEABLE BATTERY

(71) Applicant: SAMSUNG SDI CO., LTD., Yongin-si, Gyeonggi-do (KR)

(72) Inventors: Kwan-Hyung Lee, Yongin-si (KR); Seok-Yoon Yoo, Yongin-si (KR); Sang-Won Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/167,802

(22) Filed: May 27, 2016

(65) Prior Publication Data

US 2017/0098802 A1 Apr. 6, 2017

(30) Foreign Application Priority Data

Oct. 2, 2015 (KR) .................. 10-2015-0139063

(51) Int. Cl.
*H01M 2/02* (2006.01)
*H01M 2/22* (2006.01)
(Continued)

(52) U.S. Cl.
CPC ....... *H01M 2/0285* (2013.01); *H01M 2/0217* (2013.01); *H01M 2/0486* (2013.01); *H01M 2/06* (2013.01); *H01M 2/22* (2013.01); *H01M 2/26* (2013.01); *H01M 2/30* (2013.01); *H01M 2/365* (2013.01); *H01M 10/04* (2013.01); *H01M 10/0431* (2013.01)

(58) Field of Classification Search
CPC ........ H01M 2/0486; H01M 2/06; H01M 2/26; H01M 2/0217; H01M 10/0431; H01M 2/22; H01M 2/30
See application file for complete search history.

(56) References Cited

U.S. PATENT DOCUMENTS

2008/0038627 A1* 2/2008 Yamauchi ............... H01M 2/34
429/53
2008/0274402 A1* 11/2008 Uh ...................... H01M 10/058
429/174
(Continued)

FOREIGN PATENT DOCUMENTS

EP 2919312 A1 9/2015
KR 2000-0006808 U 4/2000
(Continued)

OTHER PUBLICATIONS

EPO Extended Search Report dated Nov. 29, 2016, for corresponding European Patent Application No. 16181155.9 (7 pages).

*Primary Examiner* — Mark F Huff
*Assistant Examiner* — Monique Wills
(74) *Attorney, Agent, or Firm* — Lewis Roca Rothgerber Christie LLP

(57) ABSTRACT

A rechargeable battery includes a conductive case including a bottom part and a wall part extending from a periphery of the bottom part, an electrode assembly including a positive electrode and a negative electrode, and accommodated in the case, a cap plate opposite to the bottom part and electrically connected to the case, a positive terminal fixed to the cap plate and electrically connected to the cap plate, a negative terminal fixed to the cap plate and electrically insulated from the cap plate, a positive electrode tab extending from the positive electrode and electrically connected to the bottom part, and a negative electrode tab extending from the negative electrode, facing the positive electrode tab, and electrically connected to the negative terminal, wherein a length of the cap plate in a first direction is less than a height of the wall part in a second direction.

9 Claims, 8 Drawing Sheets

(51) Int. Cl.
*H01M 2/30* (2006.01)
*H01M 2/36* (2006.01)
*H01M 10/04* (2006.01)
*H01M 2/04* (2006.01)
*H01M 2/06* (2006.01)
*H01M 2/26* (2006.01)

(56) References Cited

U.S. PATENT DOCUMENTS

| | | |
|---|---|---|
| 2011/0064972 A1 | 3/2011 | Park et al. |
| 2011/0076547 A1 | 3/2011 | Shin |
| 2012/0258338 A1 * | 10/2012 | Kim .................... H01M 2/0404 429/53 |
| 2013/0196179 A1 | 8/2013 | Han et al. |
| 2013/0330593 A1 | 12/2013 | Kim et al. |
| 2014/0234676 A1 | 8/2014 | Tyler et al. |
| 2014/0377639 A1 | 12/2014 | Kwak et al. |
| 2015/0010805 A1 | 1/2015 | Han et al. |

FOREIGN PATENT DOCUMENTS

| | | |
|---|---|---|
| KR | 10-2006-0018412 A | 3/2006 |
| KR | 10-2008-0016049 A | 2/2008 |
| KR | 10-2009-0056027 A | 6/2009 |
| KR | 10-2011-0035566 A | 4/2011 |
| KR | 10-2013-0138678 A | 12/2013 |
| KR | 10-2015-0004196 A | 1/2015 |

* cited by examiner

RECHARGEABLE BATTERY

CROSS-REFERENCE TO RELATED APPLICATION

This application claims priority to and the benefit of Korean Patent Application No. 10-2015-0139063 filed on Oct. 2, 2015, in the Korean Intellectual Property Office, the disclosure of which is incorporated by reference herein in its entirety.

BACKGROUND

1. Field

The described technology relates to a rechargeable battery.

2. Description of the Related Art

A rechargeable battery, which is configured to be repeatedly charged and discharged, is typically used as an energy source for various electronic devices or a vehicle. When the rechargeable battery is a large-sized battery, such as a battery for a vehicle, the rechargeable battery should have characteristics that are suitable for mass production and should have high energy density.

The above information disclosed in this Background section is only for providing enhancement of understanding of the background of the described technology and therefore it may contain information that does not form the prior art.

SUMMARY

Embodiments of the present invention provide a rechargeable battery having high energy density. Further, embodiments of the present invention provide a rechargeable battery suitable for mass production.

A rechargeable battery according to one or more embodiments of the present invention includes a conductive case including a bottom part and a wall part extending from a periphery of the bottom part, an electrode assembly including a positive electrode and a negative electrode and accommodated in the case, a cap plate opposite to the bottom part and electrically connected to the case, a positive terminal fixed to the cap plate and electrically connected to the cap plate, a negative terminal fixed to the cap plate and electrically insulated from the cap plate, a positive electrode tab extending from the positive electrode and electrically connected to the bottom part, and a negative electrode tab extending from the negative electrode, the negative electrode tab facing the positive electrode tab and electrically connected to the negative terminal, wherein a length of the cap plate in a first direction is less than a height of the wall part in a second direction.

The bottom part and the positive electrode tab may be welded to each other, and a welding part may be located at an outer surface of the bottom part.

The bottom part and the wall part may be integrally formed.

The wall part may be extrusion molded, and the bottom part and the wall part may be welded together.

The electrode assembly may include a first electrode structure and a second electrode structure.

The positive electrode tab may include a first positive electrode tab connected to the first electrode structure and a second positive electrode tab connected to the second electrode structure, wherein the first positive electrode tab and the second positive electrode tab may be adjacently connected to each other, and the negative electrode tab may include a first negative electrode tab connected to the first electrode structure and a second negative electrode tab connected to the second electrode structure, wherein the first negative electrode tab and the second negative electrode tab may be adjacently connected to each other.

A retainer may be between an inner surface of the bottom part and the electrode assembly such that the positive electrode tab may contact the inner surface of the bottom part.

The cap plate may include an electrolyte injection opening sealed by a pin, and the electrolyte injection opening may be covered by the positive electrode terminal.

The positive electrode terminal may include a hook that is engaged with a slit defined in the cap plate.

The rechargeable battery may be a prismatic type battery.

BRIEF DESCRIPTION OF THE DRAWINGS

Various aspects will become apparent to those of ordinary skill in the art by describing in detail exemplary embodiments of the present invention with reference to the attached drawings, in which.

DETAILED DESCRIPTION

Figure 1:
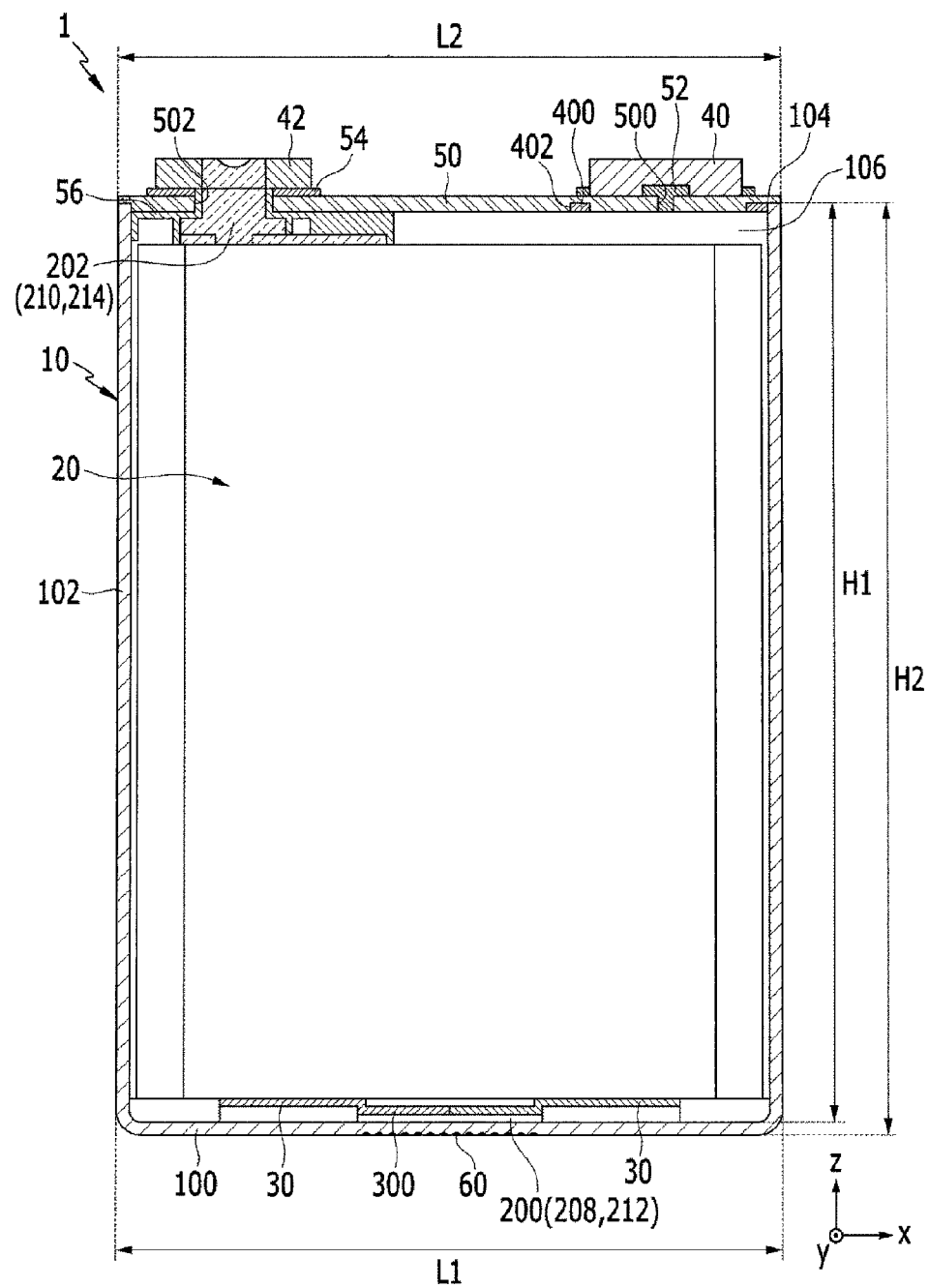
FIG. 1 is a cross-sectional view showing a rechargeable battery according to one or more exemplary embodiments.

Example embodiments of the present invention are described more fully hereinafter with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present. In addition, the word "on" may mean positioning on or below the object portion, but does not necessarily mean positioning on the upper side of the object portion based on a gravitational direction.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
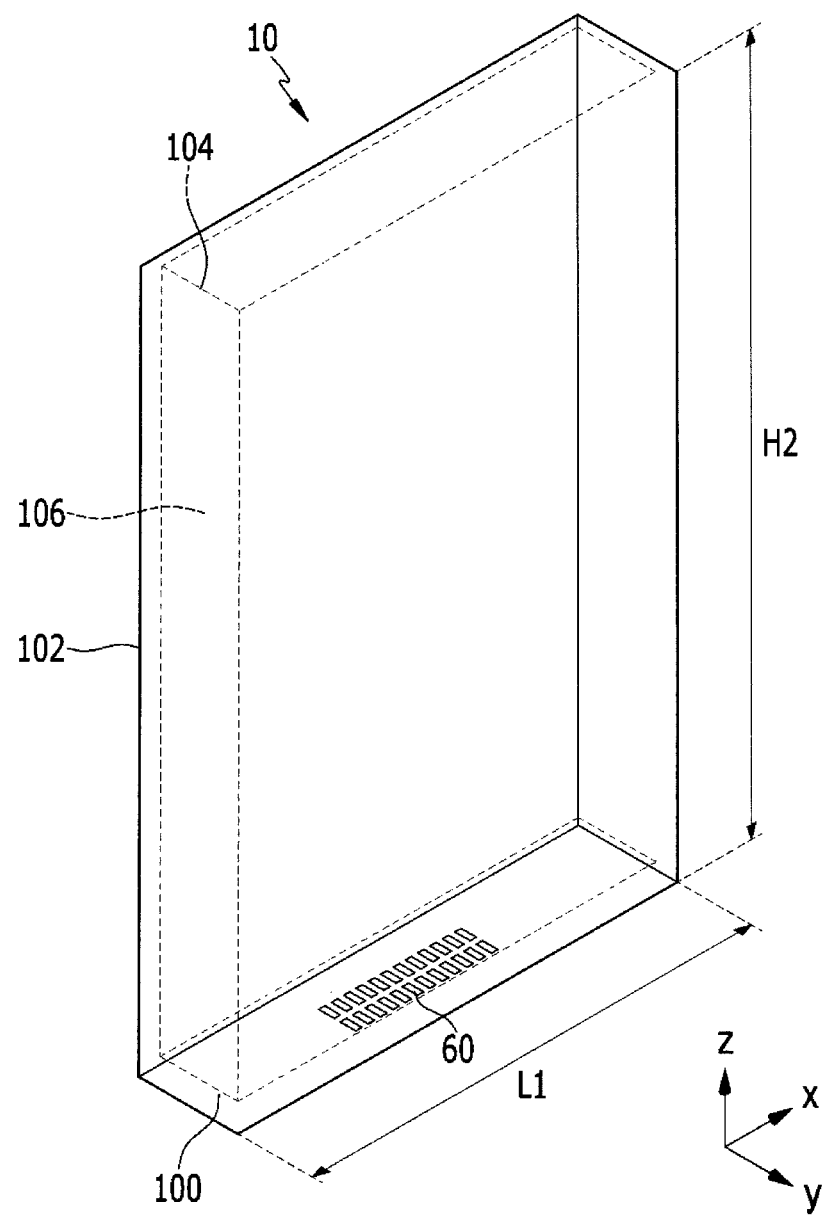
FIG. 2 is a perspective view showing a case of a rechargeable battery according to one or more exemplary embodiments.

FIG. 1 is a cross-sectional view of a rechargeable battery 1 according to one or more exemplary embodiments, and FIG. 2 is a perspective view of a case 10 of the rechargeable battery 1 according to one or more exemplary embodiments.

As shown in FIGS. 1 and 2, the rechargeable battery 1 may have a prismatic geometry. Accordingly, the rechargeable battery 1 includes the case 10, which has a substantially rectangular hexahedral shape. In more detail, the case 10 includes a bottom part 100 having a rectangular shape with a length L1 in a first direction (e.g., an x-axis direction) and a wall part 102 extending in a second direction (e.g., a z-axis direction) from a periphery of the bottom part 100 and having a height H1.

Accordingly, the case 10 has a height H2 that is equal to the sum of a thickness of the bottom part 100 and the height H1 of the wall part 102. Also, an opening 104 is formed (or defined) at one side of the case 10, e.g., at a side opposite to and facing the bottom part 100, and an inner space 106 (e.g., an inner space having a predetermined size) is defined inside the case 10. The case 10 may be made of a conductive material, and may be processed by a deep drawing method, for example.

An electrode assembly 20 is accommodated in the inner space 106 of the case 10. The electrode assembly 20 includes a positive electrode, a negative electrode, and a separator that may be stacked and rolled in a jelly roll shape, such that the electrode assembly 20 may be accommodated in the inner space 106. A positive electrode tab 200 may extend from and be connected to the positive electrode of the electrode assembly 20 and a negative electrode tab 202 may extend from and be connected to the negative electrode of the electrode assembly 20.

Figure 3:
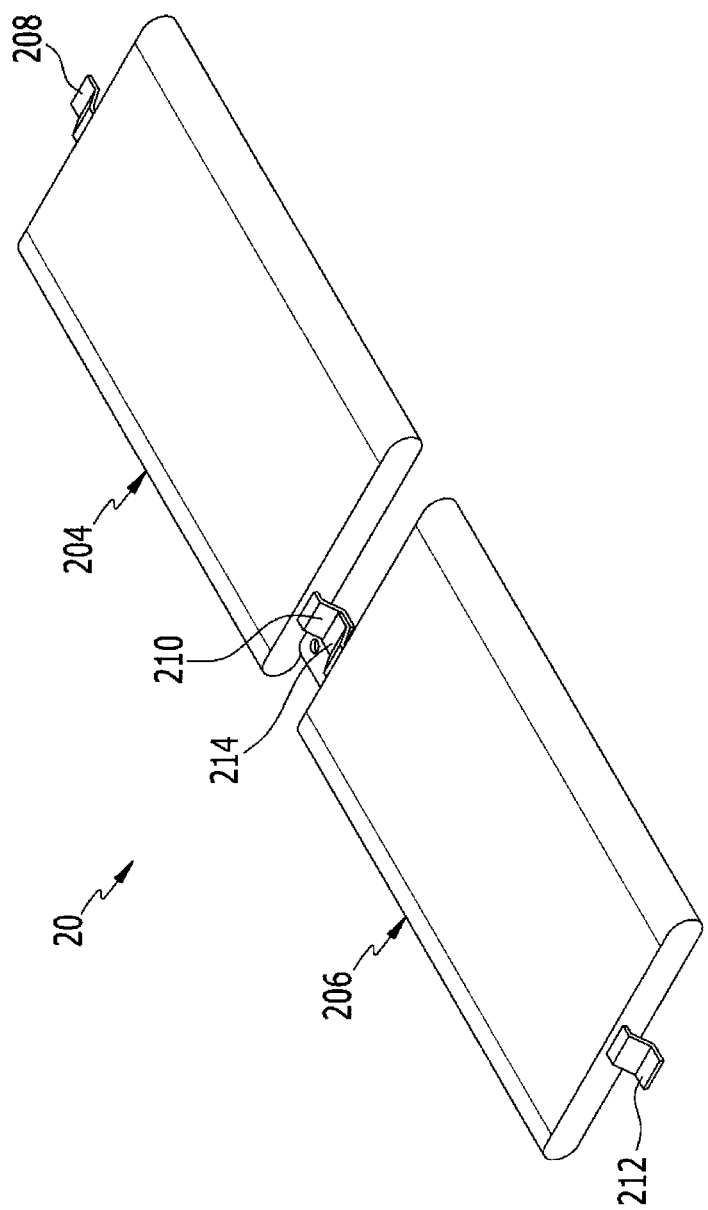
FIG. 3 is a perspective view showing a first electrode structure and a second electrode structure of a rechargeable battery according to one or more exemplary embodiments in an unfolded state.

Referring to FIG. 3, the electrode assembly 20 may include a first electrode structure 204 and a second electrode structure 206. The first electrode structure 204 and the second electrode structure 206 may each have a jelly roll structure including the positive electrode, the negative electrode, and the separator, and may include the positive electrode tab 200 and the negative electrode tab 202. Accordingly, the first electrode structure 204 may include a first positive electrode tab 208 and a first negative electrode tab 210, and the second electrode structure 206 may include a second positive electrode tab 212 and a second negative electrode tab 214.

Figure 4:
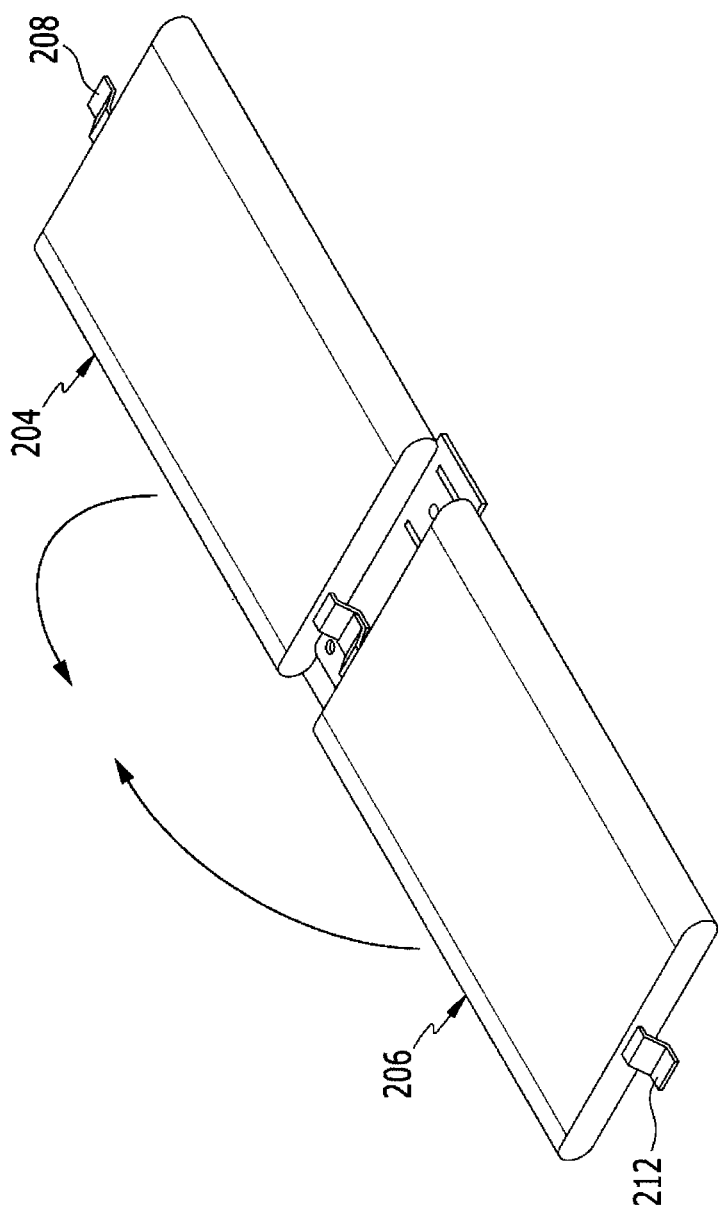
FIG. 4 is a perspective view showing a folding direction of a first electrode structure and a second electrode structure of a rechargeable battery according to one or more exemplary embodiments.

The first electrode structure 204 and the second electrode structure 206 are connected (e.g., electrically connected) by contacting the first positive electrode tab 208 and the second positive electrode tab 212 with each other, and by contacting the first negative electrode tab 210 and the second negative electrode tab 214 with each other. As illustrated in FIG. 3, in an unfolded state, the first electrode structure 204 and the second electrode structure 206 are elongated by being unfolded and are connected at the first negative electrode tab 210 and the second negative electrode tab 214 with the first positive electrode tab 208 and the second positive electrode tab 212 at opposing ends of the connected structure. However, as illustrated in FIG. 4, in a folded state, the first electrode structure 204 and the second electrode structure 206 are folded with respect to a bonding part of the first negative electrode tab 210 and the second negative electrode tab 214 such that the first positive electrode tab 208 and the second positive electrode tab 212 may be disposed to be adjacent to each other, and the first negative electrode tab 210 and the second negative electrode tab 214 may be disposed to be adjacent to each other. The first negative electrode tab 210 and the second negative electrode tab 214 may be bonded together through ultrasonic welding, for example.

The electrode assembly 20 is accommodated (or housed) in the inner space 106 of the case 10 and is fixed such that the first positive electrode tab 208 and the second positive electrode tab 212 contact an inner surface of the bottom part 100. A retainer 30 may be installed between the first and second positive electrode tabs 208 and 212 and the bottom part 100 such that the first and second positive electrode tabs 208 and 212 contact (e.g., closely contact) the inner surface of the bottom part 100 (refer to FIG. 1). The retainer 30 is described further below.

The opening 104 of the case 10 is covered by a cap plate 50. A positive electrode terminal 40 and a negative terminal 42 are installed at (or on) the cap plate 50 (e.g., are installed at a predetermined interval). The cap plate 50 has a rectangular plate shape having a length L2 corresponding to the length L1 of the bottom part 100. The length L2 of the cap plate 50 is less than the height H1 of the wall part 102 of the case 10. The cap plate 50 may define an electrolyte injection opening 500 and a vent. The electrolyte injection opening 500 is sealed by a pin 52, and the positive electrode terminal 40 is installed at the cap plate 50 and covers the electrolyte injection opening 500. Hooks 400 may be formed at both ends of the positive electrode terminal 40, and the cap plate 50 may be provided with slits 402 be engaged with (or inserted in or coupled to) the hooks 400.

Also, the negative terminal 42, which is connected to the first negative electrode tab 210 and the second negative electrode tab 214, is installed at (or on) the cap plate 50. The negative terminal 42 is installed at the cap plate 50 and electrically insulated from the cap plate 50. As such, a gasket 54 is interposed between the negative terminal 42 and the surface of the cap plate 50, and an insulating structure 56 may be fixed to the cap plate 50 at an opening 502 of the cap plate 50 at the negative terminal 42, and may extend between the cap plate 50 and the electrode assembly 20.

The negative terminal 42 and the first and second negative electrode tabs 210 and 214 may be connected by laser welding, for example. In some exemplary embodiments, before the first electrode structure 204 and the second electrode structure 206 are accommodated in the inner space 106 of the case 10 (for example, when the electrode assembly 20 is in the unfolded state as illustrated in FIG. 3), the negative terminal 42 and the first and second negative electrode tabs 210 and 214 may contact each other and may be connected by laser welding.

Figure 5A:
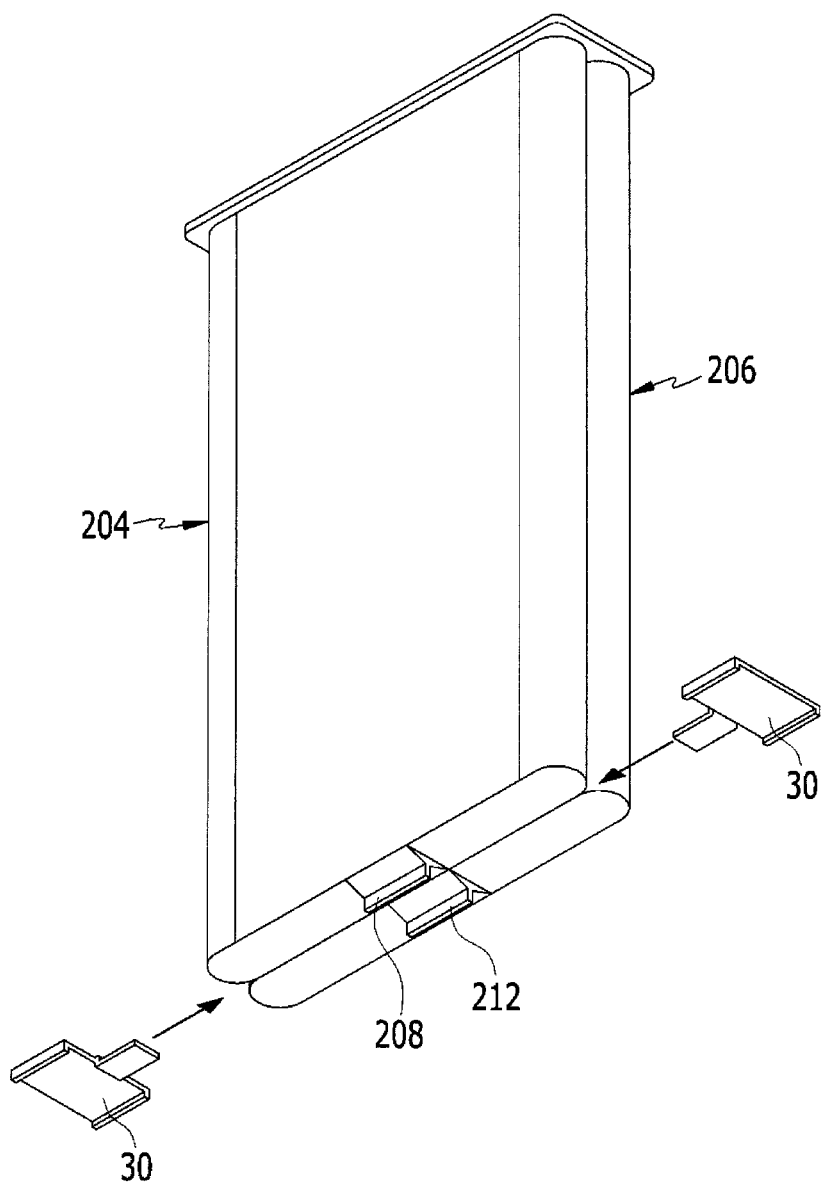
FIGS. 5A-5B are perspective views showing a process of installing a retainer on an electrode assembly of a rechargeable battery according to one or more exemplary embodiments.
Figure 5B:
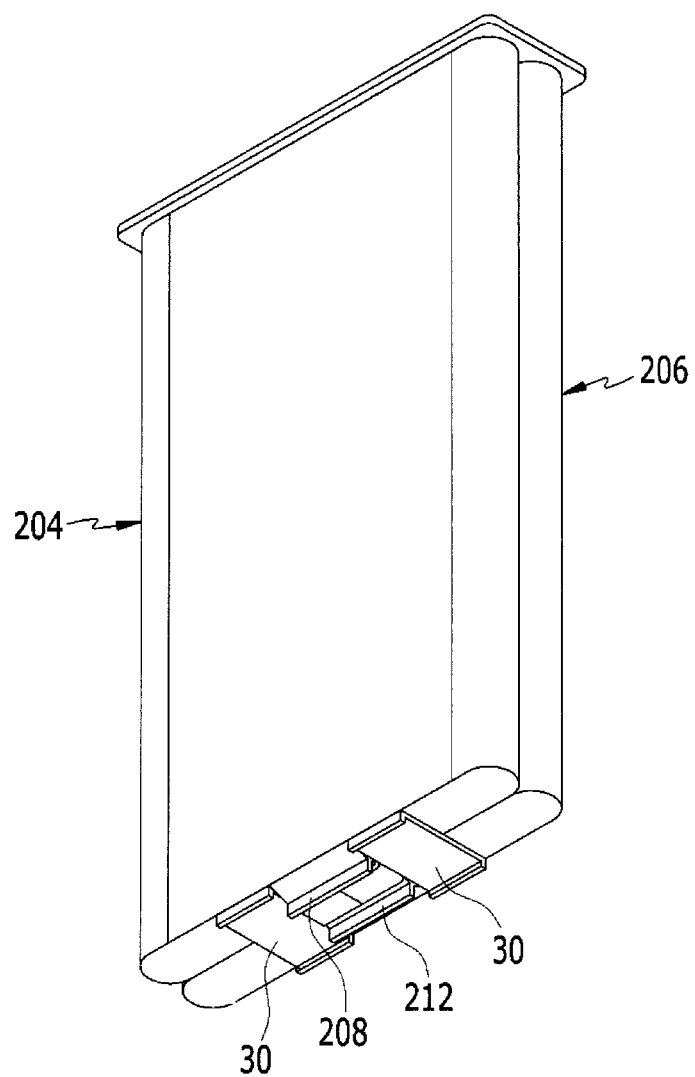

Referring to FIG. 4, the first electrode structure 204 and the second electrode structure 206 are folded to face each other, as described above. The retainer 30 may be provided at both sides of the adjacent first positive electrode tab 208 and the second positive electrode tab 212 such that a protrusion 300 may be disposed between the first positive electrode tab 208 and the second positive electrode tab 212 (refer to FIGS. 1, 5A, and 5B).

The first positive electrode tab 208 and the second positive electrode tab 212 may be folded to enclose and contact the protrusion 300 of the retainer 30.

Figure 6:
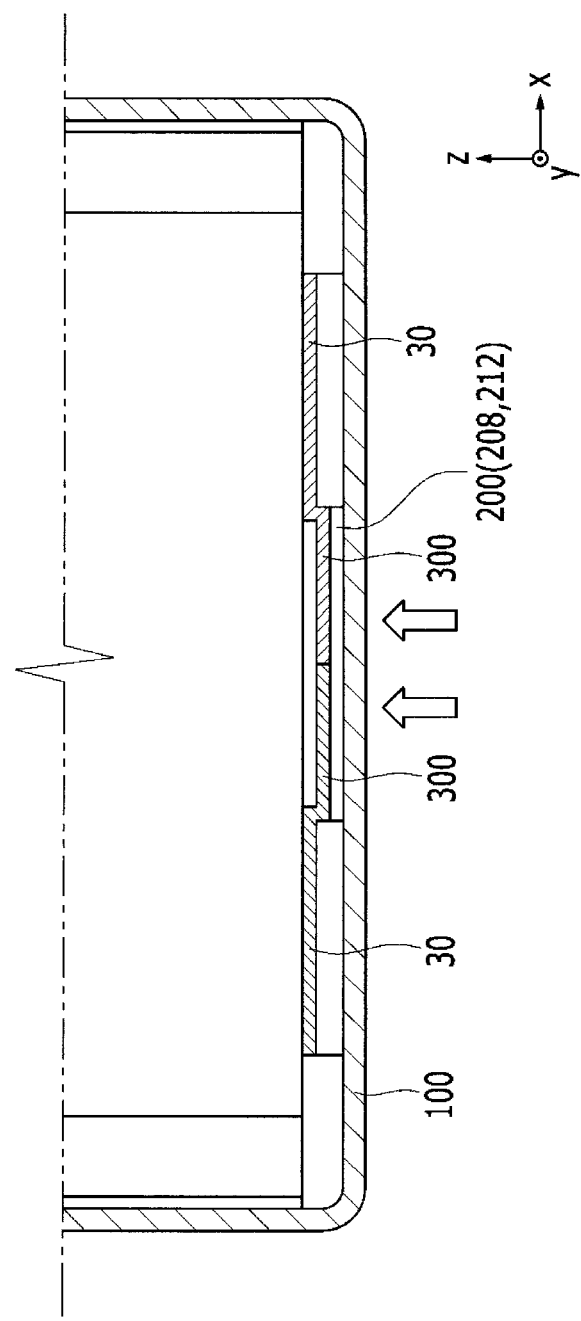
FIG. 6 is a partial cross-sectional view showing a process of fixing a positive electrode tab to a bottom part of a case of a rechargeable battery according to one or more exemplary embodiments.

After the electrode assembly 20 is inserted into the inner space 106 of the case 10, the first positive electrode tab 208 and the second positive electrode tab 212 are fixed to the inner surface of the bottom part 100. For example, the first positive electrode tab 208 and the second positive electrode tab 212 may be welded to the bottom part 100 from outside the case 10, as shown in FIG. 6. Accordingly, a welding part 60 generated by the welding may remain on an outer surface of the bottom part 100 (refer to FIGS. 1 and 2). Furthermore, the cap plate 50 may also be fixed to the wall part 102 by welding along a periphery thereof when the cap plate 50 is mounted on the wall part 102.

The electrolyte solution is then injected into the case 10 through the electrolyte injection opening 500 and the electrolyte injection opening 500 is sealed by the pin 52. The positive electrode terminal 40 is then installed at the cap plate 50 to cover the electrolyte injection opening 500.

Accordingly, in the rechargeable battery 1 according to one or more exemplary embodiments, the positive electrode tab 200 of the electrode assembly 20 is connected (e.g., directly connected) to the case 10, and the cap plate 50 that is electrically connected to the positive electrode terminal 40 is connected (e.g., directly connected) to the case 10, thereby allowing for flow of positive electrode current throughout the case 10. As such, the rechargeable battery 1 may receive the positive electrode current from the entire region of the case 10 by the positive electrode terminal 40 and the energy density may be improved through the smooth flow of current.

Also, the positive electrode tab 200 and the case 10 may be connected by welding at the bottom part 100 of the case 10 from outside the case 10, which may simplify manufacturing.

Figure 7:
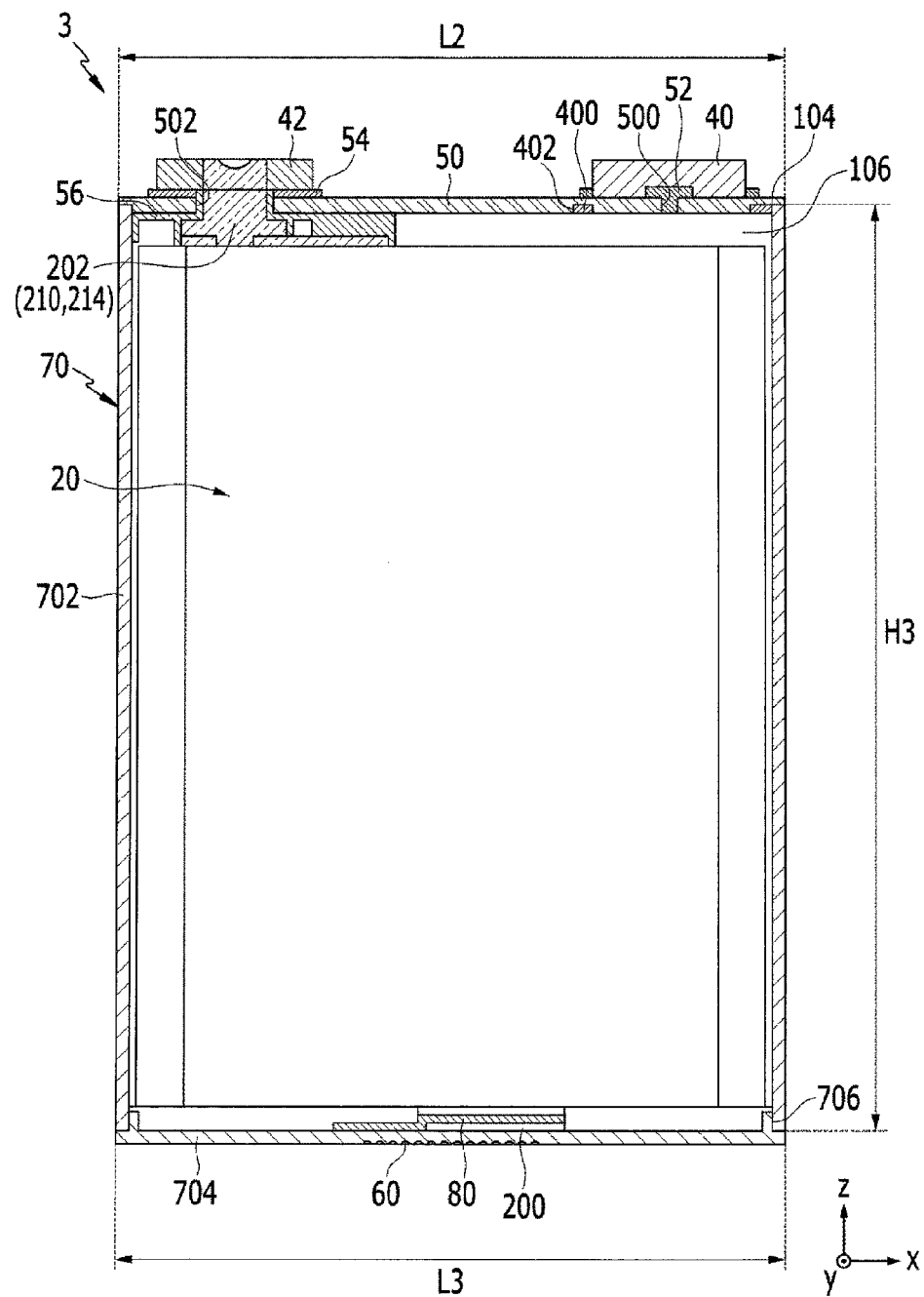
FIG. 7 is a cross-sectional view showing a rechargeable battery according to one or more exemplary embodiments.

FIG. 7 is a cross-sectional view of a rechargeable battery according to one or more exemplary embodiments. The rechargeable battery 3 according to one or more exemplary embodiments has the same basic configuration as the rechargeable battery 1 described above. However, the bottom part and the wall part of the rechargeable battery 3, which form a case 70, may not be integrally formed, but are instead separately formed and subsequently united. Hereinafter, differences between the rechargeable battery 1 and the rechargeable battery 3 are primarily described.

As shown in FIG. 7, a conductive case 70 of the rechargeable battery 3 includes a wall part 702 having a height H3, and a bottom part 704 having a length L3 that is less than the height H3. The wall part 702 of the case 70 may be formed by extrusion molding, and the bottom part 704 is combined with the wall part 702 to cover a bottom opening 706 of the wall part 702 facing the cap plate 50.

In the present exemplary embodiment, the positive electrode tab 200 of the electrode assembly 20 contacts the bottom part 704 and is fixed thereto. A retainer 80 may be provided at an inner surface of the bottom part 704 after the positive electrode tab 200 is coupled to the retainer 80, and like the above exemplary embodiment, the retainer 80 and the positive electrode tab 200 may be fixed to the bottom part 704 by welding (for example, by ultrasonic welding) from the outside of the bottom part 704.

The rechargeable battery 3 according to one or more exemplary embodiments shares at least the same effects of the rechargeable battery 1 according to one or more exemplary embodiments, but with a lower production cost because the wall part 702 of the case 70 may be formed by an extrusion molding process, thereby further reducing manufacturing costs.

According to one or more exemplary embodiments, the case is utilized as a positive electrode current path of the electrode assembly. Accordingly, the current flow may be uniform or substantially uniform on the entire region of the battery, thereby improving energy density.

The positive electrode of the electrode assembly and the case are electrically connected by welding performed outside the bottom part of the case, thereby simplifying manufacture (or facilitating workability). This improves work productivity, thereby obtaining a result appropriate for mass production.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

| Description of some of the symbols | |
|---|---|
| 1, 3: rechargeable battery | 10, 70: case |
| 20: electrode assembly | 60: welding part |
| 102, 702: wall part | 100, 704: bottom part |
| 200: positive electrode tab | 202: negative electrode tab |

What is claimed is:

1. A rechargeable battery comprising:
    a conductive case comprising a bottom part and a wall part extending from a periphery of the bottom part;
    an electrode assembly comprising a positive electrode and a negative electrode, and accommodated in the case;
    a cap plate opposite to the bottom part and electrically connected to the case;
    a positive terminal fixed to the cap plate and electrically connected to the cap plate;
    a negative terminal fixed to the cap plate and electrically insulated from the cap plate;
    a positive electrode tab extending from the positive electrode, contacting the bottom part, and being electrically connected to the bottom part; and
    a negative electrode tab extending from the negative electrode, the negative electrode facing the positive electrode tab and being electrically connected to the negative terminal,
    wherein a length of the cap plate in a first direction is less than a height of the wall part in a second direction;
    wherein the bottom part and the positive electrode tab are welded to each other, and a welding part is located at an outer surface of the bottom part.

2. The rechargeable battery of claim 1, wherein the bottom part and the wall part are integrally formed.

3. The rechargeable battery of claim 1,
    wherein the wall part is extrusion molded, and
    wherein the bottom part and the wall part are welded together.

4. The rechargeable battery of claim 1, wherein the electrode assembly comprises a first electrode structure and a second electrode structure.

5. The rechargeable battery of claim 4,
    wherein the positive electrode tab comprises a first positive electrode tab connected to the first electrode structure and a second positive electrode tab connected to the second electrode structure, the first positive electrode tab and the second positive electrode tab being adjacently connected to each other, and
    wherein the negative electrode tab comprises a first negative electrode tab connected to the first electrode structure and a second negative electrode tab connected to the second electrode structure, the first negative electrode tab and the second negative electrode tab being adjacently connected to each other.

6. The rechargeable battery of claim 1, further comprising a retainer between an inner surface of the bottom part and the electrode assembly such that the positive electrode tab contacts the inner surface of the bottom part.

7. The rechargeable battery of claim 1,
    wherein the cap plate includes an electrolyte injection opening sealed by a pin, and
    wherein the electrolyte injection opening is covered by the positive terminal.

8. The rechargeable battery of claim 7, wherein the positive terminal comprises a hook that is engaged with a slit defined in the cap plate.

9. The rechargeable battery of claim 1, wherein the rechargeable battery is a prismatic type battery.

* * * * *